Feb. 26, 1963 R. M. MILTON 3,078,634
SWEETENING AND DRYING OF NATURAL GAS
Filed Nov. 30, 1959 6 Sheets-Sheet 6

FIG. 6.

INVENTOR.
ROBERT M. MILTON
BY
*William F. Mesinger*
ATTORNEY.

United States Patent Office 3,078,634
Patented Feb. 26, 1963

3,078,634
SWEETENING AND DRYING OF NATURAL GAS
Robert M. Milton, Buffalo, N.Y., assignor to Union Carbide Corporation, a corporation of New York
Filed Nov. 30, 1959, Ser. No. 856,288
7 Claims. (Cl. 55—33)

This invention relates to the sweetening and drying of natural gas, and more specifically relates to an improved process for sweetening and drying a natural gas stream by contact with an adsorbent material.

Sweetening and drying natural gas streams is extremely important to industry for several reasons. The presence of sulfur-containing compounds in such streams may result in the deposition of sulfur salts which can cause plugging and corrosion of transmission pipes, valves, regulators and the like. Also, the sulfur compounds may produce undesirable side reactions with other materials contacting the natural gas stream.

Similarly, if water is not removed from the natural gas stream, hydrocarbon-water hydrates are formed which deposit as solids. Such hydrates can cause plugging of pipelines, freezing of valves and regulators, and excessive pressure drops in the pipelines. Furthermore, dehydration of natural gas eliminates the need for costly and elaborate injections of hydrate-suppressing alcohol or glycerol into transmission conduits. For these reasons, gas transmission companies specify that the hydrogen sulfide content of the gas cannot exceed 4 p.p.m. by volume. Also, the maximum allowable water content varies between 84 and 190 p.p.m. by volume (4 and 9 lbs. $H_2O$/MM s.c.f.) depending on the locale.

The tremendous increase in demand for natural gas in recent years has made the gas producers far more dependent on "sour" gas fields than ever before. As used herein, a "sour" gas is defined as a gas containing mercaptans and possibly $H_2S$. "Sweetening" is defined as the removal of $H_2S$ mercaptans, and any $H_2S$ present from a gas or a liquid stream. Formerly, when a gas well came in "sour," it was capped off because the supply and demand situation did not merit its purification. Recently, these capped wells have been put into production and new completions are being utilized regardless of $H_2S$ content.

There are a number of sweetening and drying processes currently being used, but they all have important and critical limitations. One widely used system involves scrubbing by monoethanolamine (MEA). The natural gas is passed through the MEA solution which absorbs the hydrogen sulfide. The solution from the absorption equipment is passed to a stripping column where heat is applied to boil the solution and release the hydrogen sulfide. The lean stripped solution is then passed to heat exchangers, and returned to the absorption equipment to again absorb hydrogen sulfide gas. The principal disadvantages of the MEA system are its high operating cost because of the corrosive nature of the absorbing liquid, and its inability to remove mercaptans and water from gas streams.

Another prior art system is the iron sponge method of purifying natural gas, utilizing iron oxide impregnated wood chips in a packed bed. The gaseous mixture containing $H_2S$ and/or mercaptans contacts a packed bed of iron oxide sponge, preferably chemically absorbing the sulfur impurities on the exposed iron oxide surface. After the bed has been saturated it is reactivated by passing heated air through the bed. One disadvantage of this method of sweetening natural gas is that a dehydration system must follow the iron sponge system to dry the gas for pipeline use. Also, the reactivation step is hazardous because of the exothermic ntaure of the reactivation reaction. Furthermore, fusion of iron sponge particles with sulfur frequently causes a high pressure drop through the bed. Finally, the operational cost is high because the absorbent must be replaced frequently.

Hydrogen sulfide has also been removed from natural gas by countercurrent extraction with a hot potassium carbonate solution. In this unit as in the MEA system, the $H_2S$ is removed by chemical combining with potassium carbonate and later released by stripping with steam. One significant disadvantage of this method of sweetening natural gas is that an MEA system must follow the potassium carbonate system to remove the final traces of $H_2S$. Furthermore, a drying system must follow the MEA system to meet pipeline dryness specifications. Finally, $CO_2$ is also removed from the gas which is a disadvantage with respect to economies of plant installation, operation and gas shrinkage.

The principal object of the invention is to provide an improved process for sweetening and drying natural gas. Further objects are to provide a single treatment system which will remove all contaminating water, mercaptans, and any $H_2S$ present from the gas stream, and a system which is dry so as to minimize corrosion of the equipment. Still another object of the invention is to provide a process for sweetening and drying a natural gas stream, which process in addition to the previously defined characteristics, has a high gas cleaning efficiency and also permits safe and efficient regeneration of the impurity removal medium. Other objects and advantages of the present invention will be apparent from the subsequent disclosure and appended claims.

It has been unexpectedly found that certain naturally occurring and synthetic zeolites of suitable pore size have a remarkably high affinity for both moisture and the mercaptan compounds present in natural gas streams. That is, the pores must be sufficiently large to permit entry of the water and mercaptan compound molecules. Molecular sieves having pores with an apparent minimum dimension of at least 9 angstrom units have been found satisfactory. Furthermore, they are so constituted in their molecular arrangement of atoms that they can effect a separation of natural gas, water and mercaptan compounds on the basis of molecular size and molecular polarity. These particular zeolitic molecular sieves not only have a high affinity for water and sulfur-containing compounds but will preferentially adsorb them rather than other substances of similar molecular dimensions. In addition, these molecular sieves demonstrate a high water and sulfur compound capacity at low vapor pressures and at elevated temperatures, thereby overcoming critical limitations of prior art natural gas cleanup systems.

The term apparent pore size as used herein may be defined as the maximum critical dimension of the molecular species which is adsorbed by the zeolitic molecular sieve in question under normal conditions. The apparent pore size will always be larger than the effective pore diameter, which may be defined as the free diameter of the appropriate silicate ring in the zeolite structure.

The term "zeolite," in general, refers to a group of naturally occurring and synthetic hydrated metal alumino-silicates, many of which are crystalline in structure. There are, however, significant differences between the various synthetic and natural materials in chemical composition, crystal structure and physical properties such as X-ray powder diffraction patterns.

The structure of crystalline zeolitic molecular sieves may be described as an open three-dimensional framework of $SiO_4$ and $AlO_4$ tetrahedra. The tetrahedra are crosslinked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off substantially all of the water of hydration. The space remaining in the crystals after activation is available for adsorption of adsorbate molecules. Any of this space not occupied by reduced elemental metal atoms will be available for adsorption of molecules having a size, shape and energy which permits entry of the adsorbate molecules into the pores of the molecular sieves.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged.

The pores size of the zeolitic molecular sieves may be varied by employing different metal cations. For example, sodium zeolite A has an apparent pore size of about 4 angstrom units whereas calcium zeolite A has an apparent pore size of about 5 angstrom units. Zeolite A is described in U.S. Patent No. 2,882,243 issued April 14, 1959.

Among the naturally occurring zeolitic molecular sieves suitable for use in the present invention is faujasite, which is adequately described in the chemical art. The preferred synthetic zeolitic molecular sieves include zeolites L, X, and Y.

Zeolite X is a synthetic crystalline zeolitic molecular sieve which may be represented by the formula:

wherein M represents a metal, particularly alkali and alkaline earth metals, $n$ is the valence of M, and $y$ may have any value up to about 8, depending on the identity of M and the degree of hydration of the crystalline zeolite. Sodium zeolite X has an apparent pore size of about 13 angstrom units. Zeolite X, its X-ray diffraction pattern, its properties, and methods for its preparation are described in detail in U.S. Patent No. 2,882,244 issued April 14, 1959.

Zeolite L is described and claimed in U.S. Patent application Serial No. 711,565 filed January 28, 1958, now abandoned.

Zeolite Y is described and claimed in U.S. Patent application Serial No. 109,487 filed May 12, 1961.

One skilled in the molecular sieve art would normally conclude that sieves having apparent pore sizes of at least 4 angstrom units would be suitable for adsorbing $H_2O$ and $H_2S$. This is because the critical dimensions of $H_2O$ and $H_2S$ are approximately 3.1 and 3.6–3.9 angstrom units, respectively. Furthermore, sodium zeolite A having an apparent pore size of about 4 angstrom units will adsorb large quantities of $H_2S$ in a static system, wherein the molecular sieve is simply exposed to an $H_2S$ atmosphere until completely saturated. It will be recognized that static data as measured in a McBain system is commonly employed in the adsorption art to predict the feasibility of dynamic adsorption separations. Contrary to these expectations, it has been found that sodium zeolite A is completely unsuitable for employment in the present invention, because the rate of $H_2S$ adsorption by a 4 angstrom pore size molecular sieve in a dynamic system is prohibitively low. As used herein, the term "dynamic system" refers to continuous contact between a moving gas feed stream and a zeolitic molecular sieve bed. Also, the term "critical dimension" refers to the diameter of the circumscribed circle of the cross section of the adsorbate molecule's minimum area. These are calculated from available bond lengths, bond angles and van der Waals radii.

It has been discovered that when mercaptans are present in the feed gas in excessive quantities, they are most efficiently removed by zeolitic molecular sieves having an apparent pore size of at least 9 angstrom units, as for example synthetic crystalline zeolites X, Y and L. This is probably due to a combination of the previously discussed adsorption rate effect, and the fact that mercaptans have larger critical dimensions than $H_2S$.

This invention contemplates a method for simultaneously removing moisture and mercaptan compounds from a natural gas stream comprising the steps of providing a bed of crystalline zeolitic molecular sieve material having an apparent pore size of at least 9 angstrom units. A moisture and mercaptan compound containing natural gas streams is provided and contacted with the zeolitic molecular sieve bed, and a gas stream depleted of such impurities is discharged from the bed. Certain critical operating conditions to provide maximum efficiency have also been discovered; these criticalities will be discussed later in detail.

The invention also provides a method for continuously removing moisture and mercaptan compounds from a natural gas stream in which at least two separate zones are provided, each containing a bed of crystalline zeolitic molecular sieve material having an apparent pore size of at least 9 angstrom units. The feed gas stream is contacted with a first zeolitic molecular sieve bed as an adsorption stroke, thereby adsorbing at least most of the moisture and mecaptan compounds. An impurity-depleted natural gas product stream is discharged from the first bed. As a desorption stroke, a heated fluid is simultaneously passed in indirect heat exchange with a second zeolitic molecular sieve bed having previously been loaded with moisture and mercaptan compounds. A heated desorbing purge gas is passed in direct contact with the second bed thereby removing the deposited materials. The desorption stroke is continued until the desorbed second bed reaches a temperature of 300–600° F., at which point the bed is recooled by passing a portion of the moisture and mercaptan-depleted natural gas product stream therethrough. The flows between the first and recooled second beds are periodically switched thereby passing the gas feed stream to the second bed as an adsorption stroke and passing the heated fluid and heated desorbing purge gases in contact with the first bed as a desorption stroke.

As used in the specification and ensuing claims, the expression "natural gas stream" refers to a mixture of gases comprising primarily methane with traces of at least the following components as minor constituents: nitrogen, carbon monoxide, carbon dioxide and ethane.

The previously discussed criticality of molecular sieve pore sizes was clearly illustrated in a series of tests involving synthetic zeolites 4A, 5A and 13X, the numerals in the designations indicating the approximate pore size and the letters identifying the type of zeolite, as previously defined. The $H_2S$ breakthrough capacity of these zeolites was determined on a natural gas stream at the following operating conditions:

TABLE I

Adsorbent: 1/16 in. pellets activated at 450° F. with a clean dry natural gas stream.
Column: 6 ft. long x 1.5 in. inside diameter.
Stream analysis:
    Methane ____________________ 99.62 mol percent
    Ethane _____________________ 0.08 mol percent
    Propane and higher___________ 0.005 mol percent
    $CO_2$ ______________________ 0.2 mol percent
    $H_2S$ ______________________ 0.11 mol percent
Flow rate__________________________ 2055 lb./hr./ft.$^2$
Pressure __________________________ 460–500 p.s.i.g.
Temperature ______________________ 60–70° F.

The following results were obtained:

| Type of Sieve | 4A | 5A | 13X |
|---|---|---|---|
| Percent at Breakthrough (lb./100 lb. of molecular sieve) | 2.43 | 6.25 | 6.50 |
| Effluent $H_2S$ Concentration Before Breakthrough (p.p.m.) | 0.3–4 | 0.3–4 | 0.3–4 |
| Effluent $H_2O$ Concentration Before Breakthrough (p.p.m.) | 1 | 1 | 1 |

These data indicate that at the indicated test conditions, zeolites 5A and 13X exhibit remarkably higher dynamic capacity than zeolite 4A, since the former will adsorb at least 2½ times as much $H_2S$ as zeolite 4A.

Molecular sieve zeolite 5A has successfully removed $H_2S$ and water from gas streams at temperatures as low as 60° F. and as high as 175° F., but these by no means represent functional limits. However, at an adsorption temperature of 175° F. the separation takes place at a considerable sacrifice in capacity. This is apparent from two tests made at identical conditions except for adsorption temperature. At a temperature of 80° F., the $H_2S$ capacity at breakthrough was 8.6 lbs./100 lbs. of adsorbent, and at 175° F. the $H_2S$ capacity was 5.4 lbs.

Figure 1:
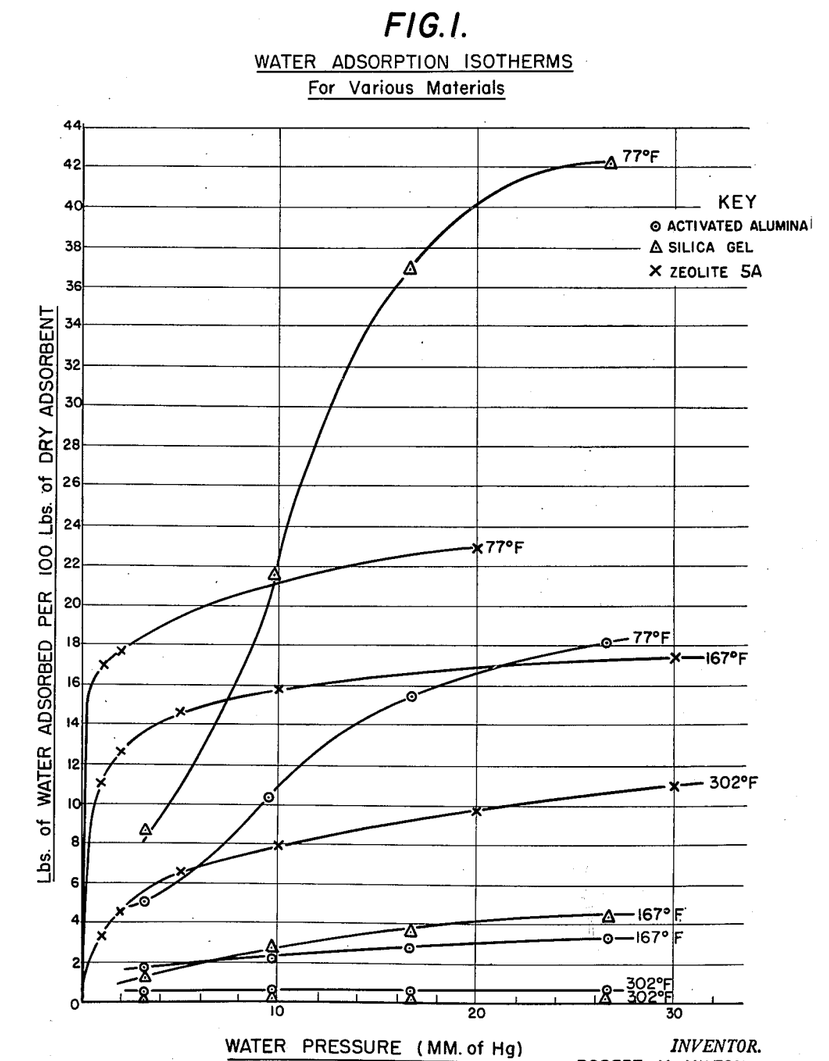
FIG. 1 shows water adsorption isotherms for various materials at various temperatures.

FIG. 1 shows water adsorption isotherms for zeolite 5A, silica gel, and activated alumina at temperatures of 77° F., 167° F. and 302° F. with lbs. of water adsorbed per 100 lbs. of dry adsorbent being plotted against the water vapor pressure in mm. of Hg. Inspection of these curves indicates that, for example at 167° F. and a vapor pressure of 20 mm. Hg., the respective capacities of zeolite 5A, silica gel, and activated alumina are 17, 4 and 3 lbs. $H_2O$ per 100 lbs. of dry adsorbent.

Figure 2:
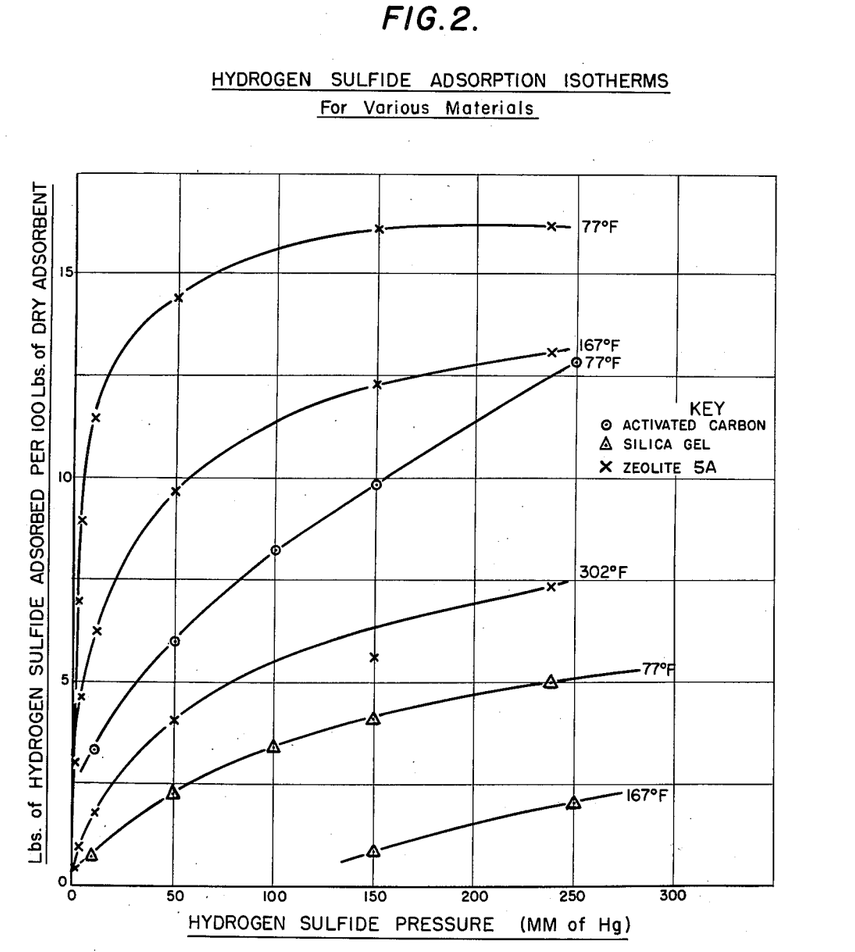
FIG. 2 shows hydrogen sulfide isotherms for various materials at various temperatures.

FIG. 2 shows hydrogen sulfide isotherms for zeolite 5A, silica gel and activated alumina at temperatures of 77° F., 167° F. and 302° F. with lbs. of $H_2S$ adsorbed per 100 lbs. of dry adsorbent being plotted against the $H_2S$ vapor pressure in mm. of Hg. Inspection of these curves indicates that, for example at 167° F. and a vapor pressure of 150 mm. Hg., the respective capacities of zeolite 5A and silica gel are 12.2 and 0.8 lb. $H_2S$ per 100 lbs. of dry adsorbent.

With regard to operating pressures, it has been found that the water and sulfur compound separation efficiency and capacity of the present zeolitic molecular sieves is not appreciably affected by the total pressure of the natural gas streams, if the other variables such as component partial pressures, temperature, linear velocity and the like, are held constant The capacity of the present zeolitic molecular sieves for $H_2S$ is affected by the amount of carbon dioxide ($CO_2$) in the natural gas stream. This will be apparent from an inspection of FIG. 3 which presents $H_2S$—$CO_2$ equilibrium adsorption curves for zeolite 5A at 70° F. and 1 atmosphere pressure. The curve shows that although $H_2S$ is preferentially adsorbed, simultaneous adsorption occurs. In natural gas streams containing 0.08 mol-percent $H_2S$ and 0.92 mol-percent $CO_2$ the mole fraction of the $H_2S$ on the adsorbent is 0.5, the remainder being $CO_2$. However, in a natural gas stream containing 0.8% $H_2S$ and 0.2% $CO_2$ the mole fraction of $H_2S$ on the zeolitic molecular sieve adsorbent would be 0.97. The effect of $CO_2$ on the capacity of zeolite 5A for $H_2S$ in a dynamic system is shown in the following Table II:

TABLE II

Test Conditions:
    Adsorbent_______________ Zeolite 5A—1/16" pellets activated at 600° F.
    Column__________________ 24 in. long by 1.049 in. I.D.
    Pressure_________________ Atmospheric.
    Adsorption temperature___ 72° F.
    Superficial linear velocity_ 0.32 ft./sec.

Results:

| | | |
|---|---|---|
| Stream Analysis | 94.3% $N_2$, 5.7% $H_2S$ | 89% $N_2$, 5.7% $H_2S$, 5.3% $CO_2$ |
| Percent $H_2S$ Loading at Breakthrough | 9.65 | 7.2 |

Figure 3:
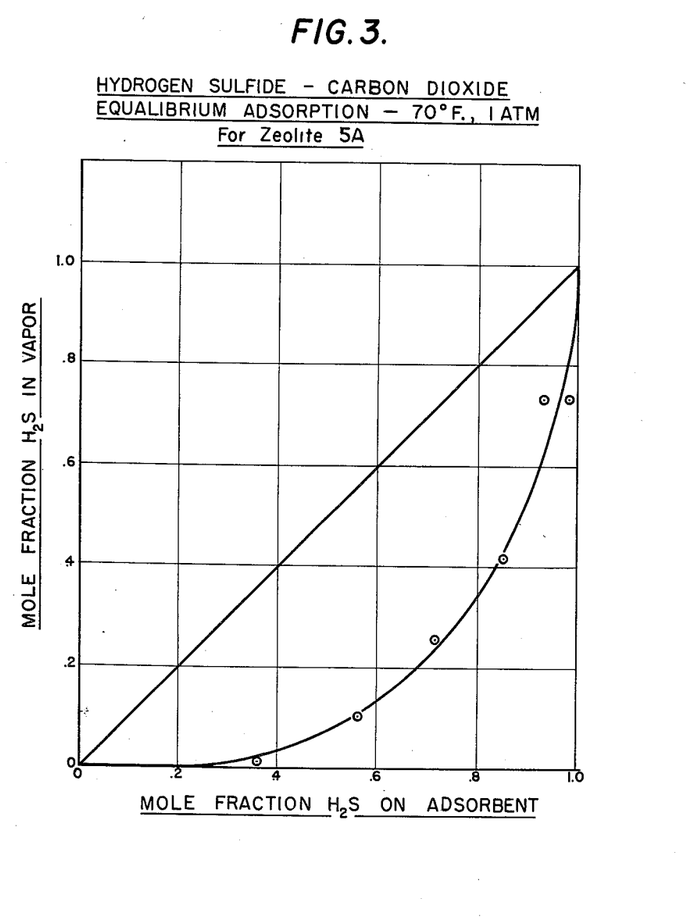
FIG. 3 shows $H_2S$—$CO_2$ equilibrium adsorption curves for zeolite 5A.

Based on FIG. 3, the preferred composition range of $H_2S$—$CO_2$ mixtures is between 0.1 and 1.0 mole fraction of $H_2S$ in the vapor, although separation could be effected below 0.1 mole fraction of $H_2S$ in the vapor. However, the capacity reduction by virtue of the simultaneous adsorption of $CO_2$ in such low $H_2S$ concentrations would probably be prohibitive as the ratio of $H_2S$ to $H_2S+CO_2$ in the vapor is reduced below 0.1. The $H_2S$ loading in this range begins to desorb off rapidly in favor of the $CO_2$ loading.

As previously discussed, certain zeolitic molecular sieves have a high affinity for water and hydrogen sulfide, and will preferentially adsorb them rather than the other natural gas constituents, even though some of the latter have molecular dimensions similar to water and hydrogen sulfide, as for example nitrogen and methane. In addition, these same zeolitic molecular sieves demonstrate high capacities for the above-mentioned impurities at low partial pressures. This remarkable and unexpected characteristic is clearly illustrated in FIGS. 4 and 5, which represents tests on zeolite 5A and 13X, and comparisons with the behavior of alumina and silica gel under the same conditions. Similar behavior is shown by the other crystalline zeolitic molecular sieves having apparent pore sizes of at least 5 angstrom units.

Figure 4:
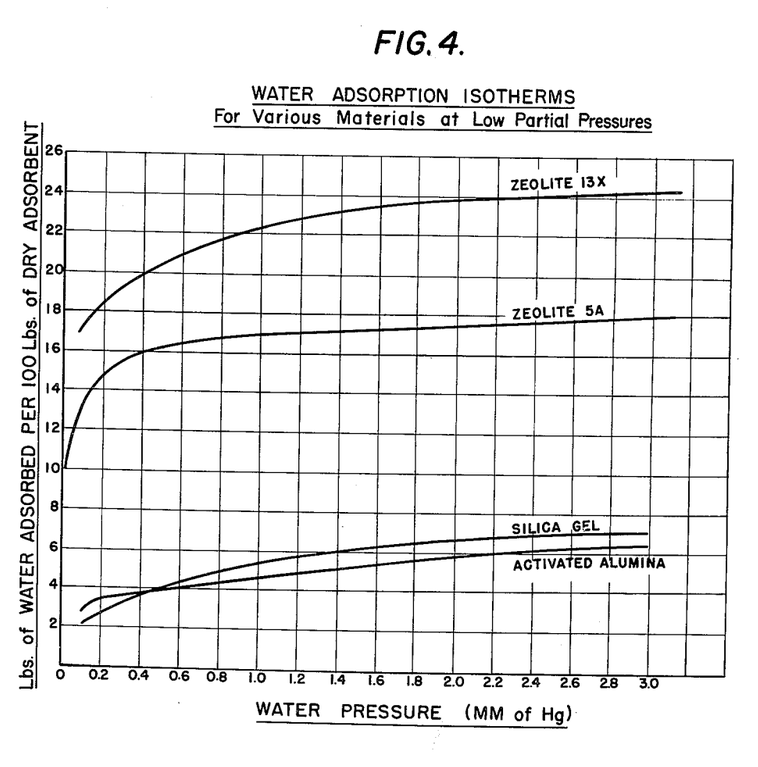
FIG. 4 shows water adsorption isotherms for various materials at low partial pressures.

FIG. 4 shows water adsorption isotherms for zeolite 5A, zeolite 13X, silica gel and activated alumina at a temperature of 77° F. (25° C.) over a water partial pressure range of 0 to 3.0 mm. Hg. An inspection of FIG. 4 will reveal the remarkably high capacities of zeolites 5A and 13Z for water at low vapor pressures as compared to conventional adsorbents. For example, at a water vapor pressure of 0.2 mm. Hg., the capacities of zeolites 5A and 13X are about 14.7 lbs. and 18.6 lbs. respectively, whereas the capacities of activated alumina and silica gel are about 3.5 lbs. and 2.8 lbs. of water respectively. This means that the water capacity of the present zeolitic molecular sieves is at least 4 times that of commonly employed adsorbents at 0.2 mm. Hg. There are frequent industrial situations wherein an inlet natural gas has a relatively small moisture content below about 50 mm. Hg. at 77° F., but where even such water traces are detrimental to the apparatus in which the gas is to be processed. One situation of this type is a low temperature natural gas distillation column, where very small quantities of water could freeze out on the liquid-gas contact surfaces and eventually cause shutdown. The present invention obviates this problem by providing an adsorption process which substantially completely removes hydrogen sulfide and water traces to below 4 p.p.m. and 1 p.p.m., respectively, in a highly efficient manner.

Figure 5:
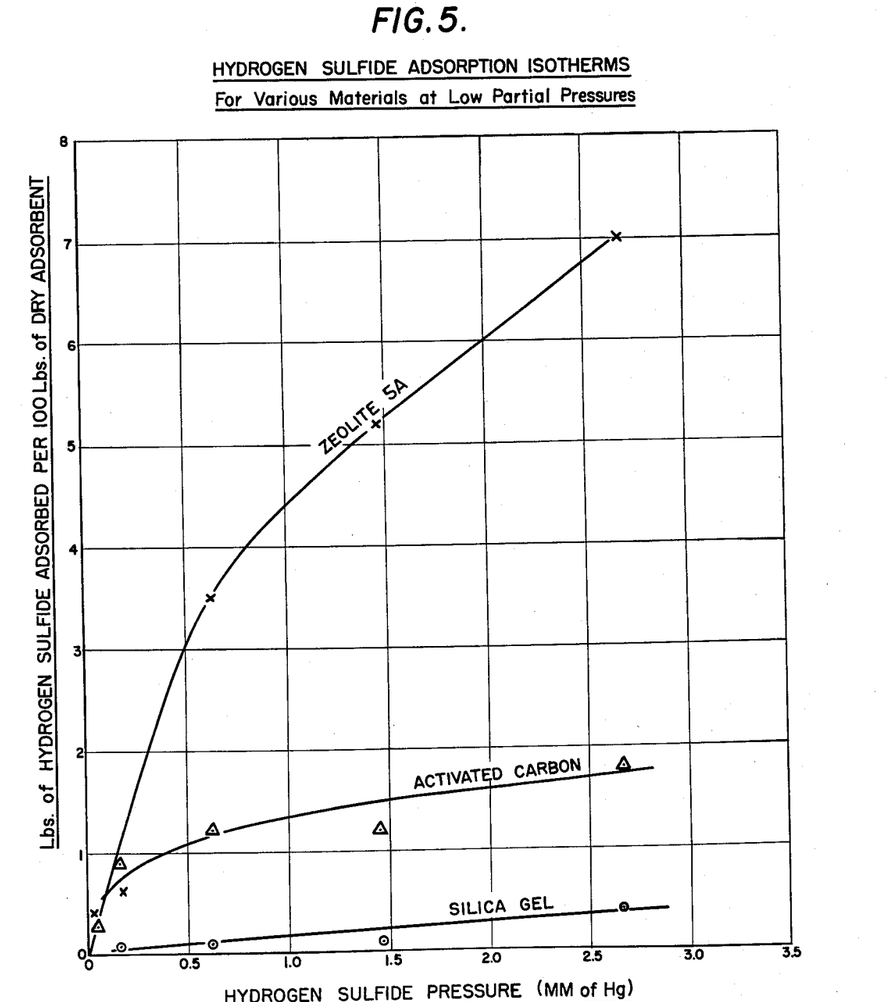
FIG. 5 shows hydrogen sulfide isotherms for various materials at low partial pressures.

FIG. 5 shows hydrogen sulfide isotherms for zeolite 5A, silica gel and activated alumina at a temperature of 77° F. (25° C.) over a hydrogen sulfide partial pressure range of 0 to 3.0 mm. Hg. It is apparent that at 77° F., zeolite 5A has an appreciable capacity for $H_2S$ at as low as 0.5 mm. partial pressure, although separations of $H_2S$ from natural gas could be effected at partial pressures lower than 0.5 mm. The preferred range of $H_2S$ concentrations (mol-percent) in natural gas streams depends upon the total pressure of the system. For example, the partial pressure of $H_2S$ and capacity containing 0.01 mol-percent $H_2S$ at atmospheric pressure would be 0.076 mm. and 0.5 lb. per 100 lbs. of molecular sieve. At 20 atmospheres operating pressure the partial pressure of $H_2S$ would be 1.52 mm. and capacity would be 5.1 lbs. $H_2S$ per 100 lbs. of molecular sieve.

Another important feature of the present invention is a method of desorbing the $H_2S$, mercaptans and water from the impurity-loaded zeolitic molecular sieve bed. The prior art has employed vacuum pressures for this purpose, but such a procedure is somewhat undesirable because of the possibility of leaks in the system creating a potential explosive mixture of methane (the major constituent of natural gas) and air. Also, desorption by heat alone is undesirable because if $H_2S$ remains in the bed as the adsorbent is cooled, the $H_2S$ is adsorbed reducing the capacity of the adsorbent. To eliminate these problems, the present method contemplates desorption of the impurity loaded zeolitic molecular sieve bed by simultaneously passing a heated fluid in indirect heat exchange with the bed, and passing a heated desorbing purge gas in direct contact with such bed. By "indirect heat exchange" is meant passage through pipes or coils embedded in the zeolitic molecular sieve bed, so that the heated fluid transfers heat through the conduit walls into the sieve bed, but never physically contacts such bed. In contrast, a hot desorbing purge gas simultaneously flows through the bed itself in intimate direct contact with the sieve material and thereby sweeps out the desorbed moisture and sulfur-containing gas. The purge gas flow may be relatively small; that is, just enough to facilitate efficient heat transfer and remove the impurities. For example, when the moisture and sulfur compound-depleted product stream is employed as the purge gas, no more than about 3% of the product is required for the purging function. The desorption step is continued until the bed reaches a temperature of at least 300° F., at which point the desorbed bed is recooled by passing at least a portion of the moisture and sulfur compound-depleted natural gas product stream through the bed. When recooling is complete, the bed may be placed back on the adsorption stroke.

Features of the invention are illustrated by the following specific examples:

*Example I.—Removal of Hydrogen Sulfide and Water From Natural Gas With 5A, 1/16 Inch Zeolitic Molecular Sieve:*

A stainless steel column 1.5 inches inside diameter by 6 feet long was filled with 1,451 grams of activated 5A, 1/16 inch zeolitic molecular sieve. At a pressure of 495 p.s.i.g. "sour" natural gas containing 0.1% $H_2S$ and 718 p.p.m. water was passed through the bed at a flow rate of 595 c.f.h. The effluent concentration of $H_2S$ was measured as a function of time and was reduced from 0.1% (1000 p.p.m.) to 0.4–4.0 p.p.m. by volume for 2.65 hours, at which point the effluent concentration increased until after 4.83 hours the effluent concentration of $H_2S$ was equal to the inlet concentration. During the entire test the effluent water concentration remained below 1.0 p.p.m. by volume compared with an inlet concentration of 718 p.p.m. In this and the succeeding examples, "breakthrough" is the point at which the effluent $H_2S$ concentration exceeds 4 p.p.m. A tabular summary of the test run follows:

| | |
|---|---|
| Gas temperature | 65° F. |
| Mass velocity (lb./hr./ft.$^2$) | 2,055 |
| Superficial linear velocity (ft./sec.) | 0.39 |
| Breakthrough capacity (lb. $H_2S$/100 lb. of dry bed) | 6.25 |
| Effluent $H_2S$ concentration before breakthrough (p.p.m.) | 0.4–4.0 |

*Example II.—Removal of Hydrogen Sulfide and Water From Natural Gas With 13X, 1/16 Inch Zeolitic Molecular Sieve:*

A 1.5 inch I.D. x 6 feet long stainless steel column was filled with 1,336 grams of activated 13X, 1/16 inch molecular sieve pellets. A pressure of 490 p.s.i.g. "sour" natural gas containing 0.0996% (996 p.p.m. by volume) $H_2S$ and 718 p.p.m. water was passed through the bed at a flow rate of 595 c.f.h. The effluent concentration of $H_2S$ was measured as a function of time and was reduced from 996 p.p.m. to between 0.4–4 p.p.m. by volume for a period of 3.68 hours before breakthrough occurred. The data are summarized as follows:

| | |
|---|---|
| Gas temperature | 66–67° F. |
| Mass velocity (lb./hr./ft.$^2$) | 2,055 |
| Superficial linear velocity (ft./sec.) | 0.39 |
| Breakthrough capacity (lb. $H_2S$/100 lb. of dry bed) | 6.50% |
| Effluent $H_2S$ before breakthrough (p.p.m.) | 0.15–4.0 |
| Effluent $H_2O$ before breakthrough (p.p.m.) | <1 p.p.m. |

*Example III.—Removal of Hydrogen Sulfide and Water From Natural Gas With 5A, 1/16 Inch Zeolitic molecular Sieve Using a 2½ Foot I.D. by 7.25 Foot Long Column:*

A steel column 2½ ft. in diameter by 7.25 feet long was filled with 870 pounds of 5A, 1/16 inch molecular sieve pellets. The bed was activated at 450° F. by passing clean dry natural gas through the bed. At a pressure of 440 p.s.i.g. "sour" natural gas containing 0.1% $H_2S$ and 1790 p.p.m. $H_2O$ was passed through the bed at a flow rate of 108,333 s.c.f.h. The effluent $H_2S$ concentration was measured as a function of time and was reduced from 0.1% to 0.4–4 p.p.m. by volume for a period of 2.23 hours before breakthrough occurred. The effluent water concentration remained 1 p.p.m. for the entire run. The breakthrough loading on this test was 3.52 pounds of $H_2S$/100 lb. dry adsorbent.

Figure 6:
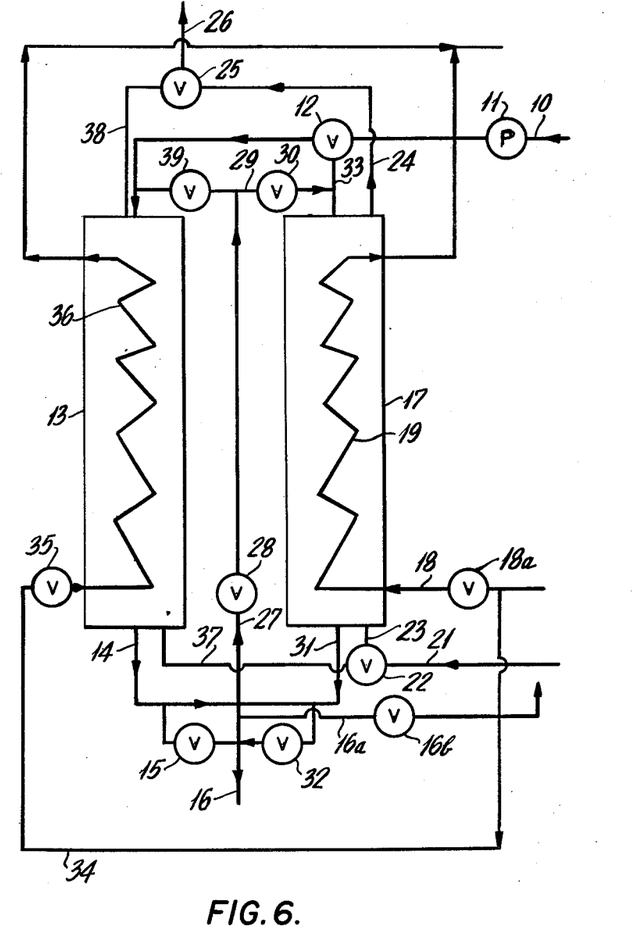
FIG. 6 is a schematic flowsheet of a process for continuously sweetening and drying natural gas according to the present invention.

The present invention also provides a process for continuously sweetening and drying a natural gas stream by advantageously and efficiently employing zeolitic molecular sieve adsorbents having an apparent pore size of at least 9 angstrom units. Referring now more specifically to FIG. 6, the inlet natural gas is introduced through conduit 10. If the inlet gas is not already in a state of substantial compression, such gas is directed through compressor 11 for compression preferably to a level of about 100 to 1,000 p.s.i.g. The compressed gas may be directed through an aftercooler if desired (not shown). The compressed inlet gas is directed through three-way control valve 12 to a first zeolitic molecular sieve bed 13. Moisture and mercaptan compounds are selectively adsorbed by the zeolitic molecular sieve material having apparent pore sizes of at least 9 angstrom units. The resulting moisture and mercaptan compound depleted natural gas product is discharged from the bed through branch conduit 14, switching valve 15 and communicating discharge conduit 16, and contains less than one p.p.m. by volume of such impurities.

While first bed 13 is on the adsorption stroke as previously described, second zeolitic molecular sieve bed 17 is on a reactivation or desorption stroke. This is accomplished by the introduction of a heated fluid through conduit 18 and control valve 18a to coils 19 embedded in the second bed 17. The heated fluid may for example be hot oil at a temperature of 300 to 600° F., and such oil preferably flows in a direction countercurrent to the inlet natural gas. The heated fluid in embedded coils 19 indirectly exchanges heat with the impurity loaded second zeolitic molecular sieve bed 17, and is withdrawn through conduit 20 for processing as desired. It is to be noted that the circulating fluid is not contaminated with the natural gas impurities, and consequently may be reheated and recirculated to inlet conduit 18 if desired.

Simultaneously with the circulation of the indirectly heat exchanging fluid in coils 19, a heated desorbing purge gas is introduced to the system through conduit 21, a three-way control valve 22 therein, and communicating branch conduit 23 to the impurity-laden second zeolitic molecular sieve bed 17 for removal of the moisture and mercaptan compounds therefrom. The purge gas preferably flows countercurrent to the direction of inlet natural gas, and parallel to the flow direction of the heated fluid in coils 19. The impurity-laden purge gas is discharged from second bed 17 into conduit 24 and through control valve 25 to discharge conduit 26 for use as desired. The preferred purge gas is a small portion of the impurity-free product natural gas having previously been discharged from the first bed 13 through conduit 16. It is of course desirable to use as small a fraction of the product gas as possible for the purging and less than about 3% of the product gas is needed for this function. To this end, a small portion of the product gas stream may be diverted from discharge conduit 16 through branch conduit 16a and control valve 16b for passage to a heater (not shown). The resulting heated clean gas may then be returned through conduit 21. The circulating purge gas also serves to increase the heat transfer rate from heated fluid in coils 19 to the desorbing molecular sieve bed 17.

As previously discussed, the desorption step should be conducted at a temperature range of at least 300° F., and preferably in the range of 300 to 600° F. to insure substantially complete removal of the moisture and mercaptan impurities from the second bed. If the desorption temperature is below 300° F., the impurities are purged at a prohibitively low rate, whereas a desorption temperature above 600° F. produces hydrolytic damage to the zeolitic cell structure and consequent loss of adsorptive capacity. After desorption the adsorbent bed 17 is recooled to its adsorption or operating temperature by terminating the heating fluid and purge gas flows by closing valves 18a and 22, respectively. Relatively cool product gas is then diverted from discharge conduit 14 through branch conduit 27 and control valve 28 to communicating conduit 29 having switching valve 30 therein. The product gas then flows through heated, reactivated second bed 17 and thereby recools such bed to the adsorption operating temperature. The cooldown product gas preferably flows in the same direction as the inlet feed gas, and is discharged from bed 17 into conduit 31 for passage to communicating discharge conduit 16.

After a period of time, depending upon the inlet concentration of the contaminants, the adsorption pressure, the amount of adsorbent, and the flow rate of the inlet gas, the quantity of moisture and sulfur-containing compounds in the product gas increases. When these concentrations reach the permissible limit, the flows are switched so that the first bed 13 is placed on desorption stroke, and second bed 17 is placed on adsorption stroke. This is accomplished by closing switching valve 15 at the discharge end of first bed 13 and opening corresponding switching valve 32 at the discharge end of second bed 17. Also, the position of three-way vale 12 at the inlet end is changed so as to permit flow of the inlet natural gas therethrough to conduit 33, communicating at the opposite end with second bed 17.

The first zeolitic molecular sieve bed 13 is purged and recooled in a manner analogous to that of second bed 17 as previously described. More specifically, the heating fluid is introduced through conduit 18, communicating branch conduit 34, control valve 35 therein, and coils 36 embedded in second bed 13. Also, the hot purge gas is introduced through conduit 21, three-way valve 22 and communicating conduit 37 to first bed 13 for flow therethrough. The resulting impurity-laden purge is discharged from first bed 13 into conduit 38 communicating with three-way valve 25, which is connected to discharge conduit 26. During cooldown, a small portion of the product gas is directed through conduit 27 and branch conduit 29 to switching valve 39 for flow through first bed 13.

In summary, the present invention affords a single-step adsorbent system for removing contaminated water and sulfur-containing compounds from a natural gas stream. The adsorbent, zeolitic molecular sieves having apparent pore sizes of at least 5 angstrom units, has a remarkably high capacity for these impurities, even after many reactivations. A method of desorbing an impurity-laden zeolitic molecular sieve bed is provided which is highly efficient and effective. Finally, the present dry system of purification minimizes corrosion of the processing equipment, which is a serious disadvantage of prior art liquid systems for purifying natural gas streams.

Although the preferred embodiments have been described in detail, it is contemplated that modifications of the process may be made and that some features may be employed without others, all within the spirit and scope of the invention as set forth herein.

This is a continuation-in-part application of my co-pending application Serial No. 400,385, filed December 24, 1953, now abandoned.

What is claimed is:

1. A method for simultaneously removing moisture and mercaptan compounds from a natural gas stream comprising the steps of providing a bed of crystalline zeolitic molecular sieve material having an apparent pore size of at least 9 angstrom units; providing a moisture and mercaptan compound containing natural gas feed stream and contacting such stream with the zeolitic molecular sieve bed; and discharging a moisture and mercaptan compound-depleted natural gas stream from such bed.

2. A method according to claim 1 in which the zeolite is crystalline zeolite X having an apparent pore size of at least 9 angstrom units.

3. A method for simultaneously removing moisture and mercaptan compounds from a natural gas stream comprising the steps of providing a bed of crystalline zeolitic molecular sieve material having an apparent pore size of at least 9 angstrom units; providing a moisture and mercaptan-containing natural gas feed stream and contacting such stream with the zeolitic molecular sieve bed as an adsorption stroke; discharging a moisture and mercaptan-depleted natural gas stream from such bed; continuing such feed stream contact and discharge until the moisture and mercaptan concentration in the discharge gas reaches a predetermined value; as a desorption stroke, simultaneously passing a heated fluid in indirect heat exchange with the moisture and mercaptan loaded bed, and passing a heated desorbing purge gas in direct contact with such bed thereby removing the adsorbed moisture and mercaptan compounds; continuing said desorption stroke until the desorbed bed reaches a temperature of 300-600° F.; recooling said desorbed bed by passing at least a portion of said moisture and mercaptan-depleted natural gas stream therethrough; discharging such recooling portion from said desorbed bed; and thereafter returning the recooled crystalline zeolitic molecular sieve bed to said adsorption stroke.

4. A method according to claim 3 in which the zeolite is crystalline sodium zeolite X having an apparent pore size of at least 9 angstrom units.

5. A method according to claim 3 in which the purge gas is a portion of said moisture and mercaptan-depleted natural gas stream comprising less than about 3% by volume of such stream, and said portion is heated prior to purging said zeolitic molecular sieve bed.

6. A method for continuously removing moisture and mercaptan compounds from a natural gas stream comprising the steps of providing at least two separate zones each containing a bed of crystalline zeolitic molecular sieve material having an apparent pore size of at least 9 angstrom units; providing a moisture and mercaptan-containing natural gas feed stream and contacting such stream with a first zeolitic molecular sieve bed as an adsorption stroke, thereby adsorbing at least most of said moisture and mercaptan containing compounds; discharging a moisture and mercaptan-depleted natural gas product stream from the first bed having a moisture content of less than about 1 p.p.m. and an equivalent $H_2S$ content of less than about 4 p.p.m.; as a desorption stroke, simultaneously passing a heated fluid in indirect heat exchange with a second zeolitic molecular sieve bed having previously been loaded with moisture and mercaptan compounds, and passing a heated desorbing purge gas in direct contact with the second bed thereby removing the adsorbed moisture and mercaptan compounds; continuing said desorption stroke until the desorbed second bed reaches a temperature of 300° F. to 600° F.; recooling said desorbed second bed by passing at least a portion of said moisture and mercaptan-depleted natural gas product stream therethrough; discharging such recooling portion from said desorbed second bed; and periodically switching the flows between the first and recooled second beds thereby passing the gas feed stream to said second bed as an adsorption stroke and passing said heated fluid and heated desorbing purge gases in contact with said first bed as a desorption stroke.

7. A method according to claim 6 in which the zeolite is crystalline zeolite X having an apparent pore size of at least 9 angstrom units; and the purge gas is a portion of said moisture and mercaptan-depleted natural gas product stream comprising less than about 3% by volume of such stream.

References Cited in the file of this patent

UNITED STATES PATENTS

| | | |
|---|---|---|
| 2,522,426 | Black | Sept. 12, 1950 |
| 2,699,837 | Van Note | Jan. 18, 1955 |
| 2,747,681 | Schuftan et al. | May 29, 1956 |
| 2,765,868 | Parks | Oct. 9, 1956 |
| 2,882,244 | Milton | Apr. 14, 1959 |

OTHER REFERENCES

"Occlusion of Hydrocarbons by Chabazite and Analcite," by R. M. Barrer et al. Transactions of the Faraday Society (London), vol. 40, 1944, page 202.

"Separation of Mixtures Using Zeolites as Molecular Sieves, Part I. Three Classes of Molecular-Sieve Zeolite," by R. M. Barrer, J. Soc. Chem. Ind., vol. 64, May 1945, pages 130 and 131.

"Examine These Ways to Use Selective Adsorption," Petroleum Refiner, vol. 36, No. 7, July 1957, pages 136–140.